(12) United States Patent
Fisher et al.

(10) Patent No.: US 9,925,743 B2
(45) Date of Patent: Mar. 27, 2018

(54) PROCESS FOR LAMINATING THIN GLASS LAMINATES

(71) Applicant: CORNING INCORPORATED, Corning, NY (US)

(72) Inventors: William Keith Fisher, Suffield, CT (US); Mark Stephen Friske, Campbell, NY (US); Paul George Rickerl, Endicott, NY (US); Huan-Hung Sheng, Horseheads, NY (US)

(73) Assignee: CORNING INCORPORATED, Corning, NY (US)

( * ) Notice: Subject to any disclaimer, the term of this patent is extended or adjusted under 35 U.S.C. 154(b) by 483 days.

(21) Appl. No.: 14/406,715

(22) PCT Filed: Jun. 12, 2013

(86) PCT No.: PCT/US2013/045317
§ 371 (c)(1),
(2) Date: Dec. 9, 2014

(87) PCT Pub. No.: WO2013/188489
PCT Pub. Date: Dec. 19, 2013

(65) Prior Publication Data
US 2015/0158277 A1    Jun. 11, 2015

Related U.S. Application Data

(60) Provisional application No. 61/659,533, filed on Jun. 14, 2012.

(51) Int. Cl.
*B32B 17/10* (2006.01)
*B32B 37/06* (2006.01)
(Continued)

(52) U.S. Cl.
CPC .. *B32B 17/10935* (2013.01); *B32B 17/10036* (2013.01); *B32B 17/1077* (2013.01);
(Continued)

(58) Field of Classification Search
CPC .................................................. B32B 17/10935
See application file for complete search history.

(56) References Cited

U.S. PATENT DOCUMENTS

| 311,497 A | 2/1885 | Keith et al. |
| 908,338 A | 12/1908 | Sheble et al. |

(Continued)

FOREIGN PATENT DOCUMENTS

| DE | 10-2006-042538 | 3/2008 | ............. C03C 27/12 |
| GB | 908338 A | 10/1962 | |

(Continued)

OTHER PUBLICATIONS

Japanese Patent Application No. 2015-517379, Notice of Grounds for Rejection, dated Jan. 21, 2016, 10 pages.
(Continued)

*Primary Examiner* — Daniel Lee
(74) *Attorney, Agent, or Firm* — Frank Brock Riggs

(57) ABSTRACT

A process for producing glass laminates including at least one sheet of glass having a thickness not exceeding 1.0 mm with reduced optical distortion and shape consistency. A pre-laminate stack of two glass sheets and a polymer interlayer are stacked between two buffer plates that are formed nominally to the desired shape of the laminate mold. The pre-laminate stack is held between the buffer plates while a vacuum is applied to the edges of the pre-laminate stack and the stack is heated to a temperature somewhat above the softening temperature of the interlayer to de-air and tack the interlayer to the two glass sheets forming the desired shaped laminate with reduced optical distortion.

20 Claims, 4 Drawing Sheets

(51) Int. Cl.
*B32B 37/10* (2006.01)
*B32B 37/18* (2006.01)

(52) U.S. Cl.
CPC .. *B32B 17/10137* (2013.01); *B32B 17/10743* (2013.01); *B32B 17/10761* (2013.01); *B32B 17/10788* (2013.01); *B32B 17/10844* (2013.01); *B32B 37/06* (2013.01); *B32B 37/1009* (2013.01); *B32B 37/1018* (2013.01); *B32B 37/18* (2013.01); *B32B 2309/02* (2013.01); *B32B 2309/105* (2013.01); *B32B 2309/12* (2013.01); *B32B 2315/08* (2013.01); *B32B 2329/06* (2013.01); *B32B 2331/04* (2013.01); *B32B 2375/00* (2013.01); *B32B 2605/08* (2013.01)

(56) References Cited

U.S. PATENT DOCUMENTS

| | | | |
|---|---|---|---|
| 3,027,288 A * | 3/1962 | Keslar | B29C 37/0064 100/90 |
| 3,806,387 A | 4/1974 | Peetz et al. | |
| 3,912,542 A | 10/1975 | Hirano et al. | |
| 3,960,627 A | 6/1976 | Halberschmidt et al. | 156/104 |
| 4,107,366 A | 8/1978 | Riser | |
| 4,398,979 A | 8/1983 | Cathers et al. | |
| 4,483,700 A | 11/1984 | Forker, Jr. et al. | 65/30.14 |
| 4,898,632 A | 2/1990 | Roth et al. | |
| 5,415,909 A | 5/1995 | Shohi et al. | |
| 5,622,580 A | 4/1997 | Mannheim | 156/106 |
| 5,674,790 A | 10/1997 | Araujo | 501/66 |
| 6,270,605 B1 | 8/2001 | Doerfler | 156/102 |
| 6,355,125 B1 | 3/2002 | Tahon et al. | 156/99 |
| 7,666,511 B2 | 2/2010 | Ellison et al. | 428/426 |
| 8,986,072 B2 | 3/2015 | Darcangelo et al. | |
| 2004/0231778 A1 | 11/2004 | Teschner et al. | |
| 2007/0052121 A1 | 3/2007 | Teschner et al. | 264/1.7 |
| 2008/0210361 A1 | 9/2008 | Bohm et al. | 156/102 |
| 2008/0264548 A1 | 10/2008 | Zhang | 156/99 |
| 2008/0264558 A1* | 10/2008 | Hayes | B32B 17/10 156/277 |
| 2009/0311497 A1 | 12/2009 | Aoki | |
| 2010/0166991 A1 | 7/2010 | Hausmann et al. | |
| 2010/0285310 A1 | 11/2010 | Izutani et al. | 428/337 |
| 2011/0192525 A1 | 8/2011 | Kondo et al. | 156/99 |
| 2012/0094084 A1* | 4/2012 | Fisher | B32B 17/10036 428/174 |
| 2012/0328843 A1 | 12/2012 | Cleary et al. | |
| 2013/0086948 A1 | 4/2013 | Bisson et al. | |
| 2013/0125589 A1 | 5/2013 | Dannoux et al. | |
| 2013/0125592 A1 | 5/2013 | Bisson et al. | |
| 2013/0127202 A1 | 5/2013 | Hart | |
| 2013/0295357 A1 | 11/2013 | Cleary et al. | |
| 2013/0319046 A1 | 12/2013 | Cleary et al. | |
| 2013/0323415 A1 | 12/2013 | Brackley et al. | |
| 2014/0017455 A1 | 1/2014 | Takagi et al. | |
| 2014/0087159 A1 | 3/2014 | Cleary et al. | |
| 2014/0087193 A1 | 3/2014 | Cites et al. | |
| 2014/0141217 A1 | 5/2014 | Gulati et al. | |
| 2014/0239034 A1 | 8/2014 | Cleary et al. | |
| 2014/0356604 A1 | 12/2014 | Borrelli et al. | |
| 2015/0064374 A1 | 3/2015 | Jain et al. | |
| 2015/0111016 A1 | 4/2015 | Fisher et al. | |
| 2015/0122406 A1 | 5/2015 | Fisher et al. | |
| 2015/0132538 A1 | 5/2015 | Cleary et al. | |
| 2015/0140301 A1 | 5/2015 | Fisher et al. | |
| 2015/0158275 A1 | 6/2015 | D'Errico et al. | |
| 2015/0158277 A1 | 6/2015 | Fisher et al. | |
| 2015/0232366 A1 | 8/2015 | Fredholm et al. | |
| 2015/0232367 A1 | 8/2015 | Joubaud et al. | |
| 2015/0251377 A1 | 9/2015 | Cleary et al. | |
| 2015/0274571 A1 | 10/2015 | Brennan et al. | |
| 2015/0321940 A1 | 11/2015 | Dannoux et al. | |
| 2016/0082705 A1 | 3/2016 | Fisher et al. | |
| 2016/0145139 A1 | 5/2016 | Fredholm et al. | |

FOREIGN PATENT DOCUMENTS

| | | |
|---|---|---|
| JP | 2001247342 A | 9/2001 |
| JP | 2003040656 A | 2/2003 |
| JP | 2008100853 A | 5/2008 |
| JP | 2008169052 A | 7/2008 |
| JP | 2011136895 | 7/2011 |
| WO | 2001030568 A1 | 9/2002 |
| WO | 2012073030 A1 | 6/2012 |
| WO | 2015031148 A1 | 3/2015 |
| WO | 2015031151 A1 | 3/2015 |
| WO | 2015031594 A2 | 3/2015 |
| WO | 2015054112 A1 | 4/2015 |

OTHER PUBLICATIONS

Patent Cooperation Treaty International Notification of Transmittal of the International Search Report and the Written Opinion of the International Searching Authority, international application No. PCT/US2013/045317: dated Aug. 26, 2013, 13 pages.

* cited by examiner

PROCESS FOR LAMINATING THIN GLASS LAMINATES

RELATED APPLICATIONS

This application claims the benefit of priority under 35 U.S.C. § 371 of International Application Number PCT/US13/45317 filed Jun. 12, 2013 which claims the benefit of priority under 35 U.S.C. § 119 of U.S. Provisional Application Ser. No. 61/659,533 filed on Jun. 14, 2012 the content of which is relied upon and incorporated herein by reference in its entirety. This application is related to U.S. Provisional Application Ser. No. 61/657,272 filed on Jun. 8, 2012.

FIELD

The present disclosure relates generally to processes for making thin glass laminates with improved optical distortion and shape consistency, and more particularly to an improved vacuum ring or vacuum bag process for making thin glass laminates with improved optical distortion and shape consistency.

BACKGROUND

Glass laminates can be used as windows and glazing in architectural and vehicle or transportation applications, including automobiles, rolling stock, locomotive and airplanes. Glass laminates can also be used as glass panels in balustrades and stairs, and as decorative panels or covering for walls, columns, elevator cabs, appliances, electronic devices and other applications. Common types of glass laminates that are used in architectural and vehicle applications include clear and tinted laminated glass structures. As used herein, a glazing or a laminated glass structure (a glass laminate) is a transparent, semi-transparent, translucent or opaque part of a window, panel, appliance, electronic device, wall or other structure having at least one glass sheet laminated to a polymeric layer, film or sheet. However, glass laminates may also be used as a cover glass on signs, electronic displays, electronic devices and appliances, as well as a host of other applications.

Automotive glazing, laminated architectural glass and other glass laminates typically consist of two plies of 2 mm thick soda lime glass (heat treated or annealed) with a polyvinyl butyral (PVB) or other polymer interlayer. These glass laminates have certain advantages, including, low cost, and a sufficient impact resistance and stiffness for automotive and other applications. However, because of their limited impact resistance, these laminates usually have a poor behavior and a higher probability of breakage when getting struck by roadside stones, vandals and other impact events.

As the global fossil fuel reserves become depleted and prices get increasingly higher the world is looking for ways to reduce its consumption to conserve energy as well as to help mitigate possible global warming. For example, the automobile industries are looking for ways to increase mileage by reducing products' weights and improving engine efficiency. One way to reduce the weight is by using thinner glass windows while preserving or even improving the performance of the window glass or glazing. Corning Incorporated has taken the lead and developed various thin yet very strong glasses such as Corning Gorilla® glass to meet different future requirements. However, as glass sheets in laminates become thinner, the glass sheets become more pliable and more easily subject to deformation under stress, which often leads to optical distortion or shape variation when laminating such thin glass to form laminated glass products.

Typical glass lamination processes for the architectural and car window industries employ either vacuum bag or vacuum ring processes. In a typical vacuum bag process, the layers of the laminate are assembled in a stack, and the stack is wrapped in different films for lamination. There are release films to prevent stack/layers from sticking to the vacuum bag, breather films to facilitate vacuuming, and finally the vacuum bag to encase the sample in a vacuum environment for de-airing. On the other hand, in a typical vacuum ring process, a vacuum ring is used to seal the periphery of the stacked layers with a rubber ring seal, which has a built in vacuum line for vacuuming. Both processes impose stress on the materials being laminated and subsequently create optical distortion and shape variations, especially when laminating thin glass sheets having a thickness not exceeding 2.0 mm or not exceeding 1.0 mm.

There is a need for an apparatus and process for laminating thin glass laminate structures with improved optical distortion and shape consistency.

No admission is made that any reference cited herein constitutes prior art. Applicant expressly reserves the right to challenge the accuracy and pertinence of any cited documents.

SUMMARY

One embodiment of the present disclosure describes a process of using a vacuum ring or vacuum bag to produce laminated glass constructions with improved optical distortion and shape consistency when at least one thin glass having a thickness not exceeding 2.0 mm or not exceeding 1.0 mm is used in the laminate. The present disclosure also discloses the use of vacuum bag in order to remove excess air from between the laminate layers and use of an autoclave in order to produce temperature and pressure conditions up to 200° C. and 180 psi for de-airing the sample and tacking the interlayer to the two glass sheets.

In order to impart a basic level of shape control to the laminates, buffer plates of soda lime glass (SLG), or other economical type of glass, may be used in direct contact with each side of each laminate. These glass buffer plates may be pre-formed to provide a reference or forming surface that corresponds to the desired shape of the thin glass laminate, which may include planar (flat) or curved shapes. The thickness of the buffer plates may be 4 mm to 6 mm. Glass laminates from thicker glass that have been laminated using a conventional de-air and tack vacuum ring processes typically still need to be processed by an additional autoclave step at relatively high temperatures and pressures for satisfactory lamination. The present disclosure teaches how to utilize a vacuum ring or a vacuum bag process to directly produce transparent glass laminates with improved optical distortion and shape consistency when thin glass is used, thus eliminating the need for an additional autoclave step at higher temperature and pressure thereby saving time and resources.

Embodiments hereof include a process of forming a thin glass laminate comprising the steps of: providing a first buffer plate having a first forming surface and a second buffer plate having a second forming surface; providing a first glass sheet, a second glass sheet and a polymer interlayer, wherein at least one of the first glass sheet and the second glass sheet has a thickness not exceeding 1 mm; stacking the first glass sheet on the first forming surface of the first buffer plate; stacking the interlayer on the first glass sheet; stacking the second glass sheet on the interlayer; stacking the second buffer plate on the second glass sheet with the second forming surface in contact with the second glass sheet forming an assembled stack; applying a vacuum to a peripheral edge of the assembled stack; heating the assembled stack to a soak temperature at or above the softening temperature of the interlayer; and maintaining the vacuum and the soak temperature for period of time (a soak time) sufficient to de-air the interlayer, tack the interlayer to the first glass sheet and the second glass sheet, and form the glass sheets and the interlayer to the first and second forming surfaces.

Both the first glass sheet and the second glass sheet may have a thickness not exceeding 1 mm. Both the first glass sheet and the second glass sheet may be chemically strengthened glass sheets.

The interlayer may be formed of a polymer from the group consisting of standard polyvinyl butyral (PVB), acoustic PVB, ethylene vinyl acetate (EVA), thermoplastic polyurethane (TPU), or an ionomer.

Other embodiments hereof include the step of placing the assembled stack in and autoclave at pressure not exceeding 180 psi during the soak time. The soak temperature may not exceed about 150° C., not exceed about 125° C., or may be in a range from about 100° C. to about 150° C.

Other embodiments hereof include the step of applying a vacuum to the peripheral edge of the assembled stack does not exceed about −0.9 bar, about −0.7 bar, does not exceed about −0.6 bar, or is in a range from about −0.2 to about −0.6 bar.

The step of applying a vacuum may include clamping a vacuum ring to the peripheral edge portion of the assembled stack and applying a vacuum in the vacuum ring. The step of heating may include heating the assembled stack to a soak temperature not exceeding 150° C.

Other embodiments hereof include the steps of placing the assembled stack in and autoclave, and maintaining a pressure within the autoclave in a range of from about 70 psi to about 180 psi during the soak time.

Other embodiments hereof include the steps of providing the first buffer plate with a first forming surface having shape nominally matching a desired shape of the glass laminate to form the assembled stack; and providing the second buffer plate with a second forming surface having shape nominally matching a desired shape of the glass laminate to form the assembled stack. At least one of the first buffer plate and the second buffer plate may be formed of a sheet of glass, such as soda lime glass, which may a thickness of about 4 mm to about 6 mm.

In some embodiments hereof, the steps of providing a first buffer plate and providing a second buffer plate comprises the steps of: providing a glass sheet; bending the glass sheet such that the glass sheet has a said forming surface having a shape nominally matching a desired shape of the glass laminate. The first buffer plate and the second buffer plate may be formed of a soda lime glass sheet having a thickness of about 4 mm to about 6 mm.

Other embodiments hereof include the step removing the assembled stack from the oven and removing the buffer plates from the glass laminate.

Other embodiments hereof include the step of applying a vacuum includes placing the assembled stack in one of a vacuum bag and a vacuum ring and applying a vacuum to the one of a vacuum bag and a vacuum ring.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments

DETAILED DESCRIPTION

Figure 1:
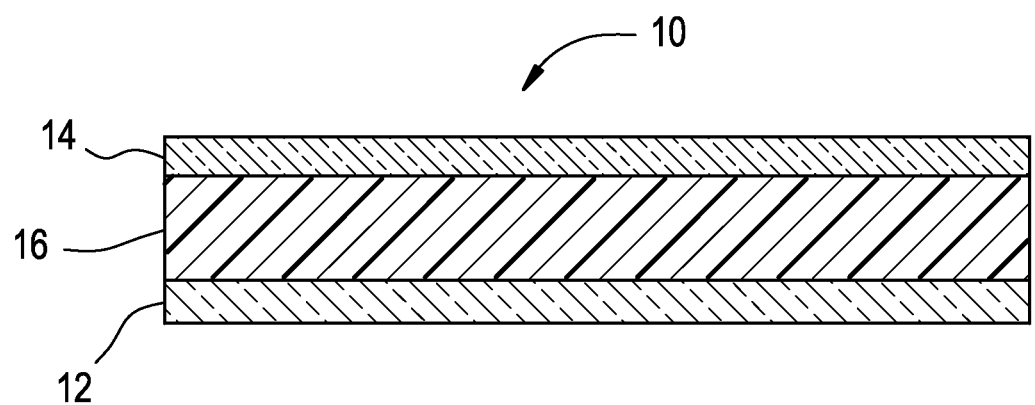
FIG. 1 is a partial cross-sectional schematic illustration of a laminated glass structure according an embodiment of the present description.

FIG. 1 is a partial cross-sectional schematic illustration (not to scale) of a thin glass laminate structure 10 according to an embodiment hereof. The thin glass laminate (or laminate or laminated structure) 10 may include a first thin glass sheet 12 about 0.7 mm thick and a second thin glass sheet 14 about 0.7 mm thick laminated one on either side of a polymeric interlayer 16. The glass sheets 12 and 14 and the polymer interlayer 16 may be bonded together during a lamination process according to the present disclosure in which the glass sheet 12, interlayer 16 and glass sheet 14 are stacked one on top of the other, and heated to a temperature somewhat above the softening temperature of the polymer interlayer such that interlayer 16 is adhered to the glass sheets. According to embodiments hereof, neither glass sheet 12 of 14, at least one of the glass sheets 12 and 14, or both of the glass sheets 12 and 14 may be formed of thin glass sheets that have been chemically strengthened using an ion exchange process, such as Corning® Gorilla® glass from Corning Incorporated.

In embodiments hereof in which both glass sheets are chemically strengthened, then the present disclosure refers to the glass laminate 10 as a "pure strengthened" laminate. When only one of the glass sheets is chemically strengthened, then the present disclosure refers the glass laminate as a "hybrid strengthened" glass laminate.

The term "thin" as used in relation to the glass sheets in the present disclosure and the appended claims means glass sheets having a thickness not exceeding about 1.5 mm, not exceeding about 1.0 mm, not exceeding 0.7 mm, not exceeding about 0.5 mm, or within a range from about 0.5 mm to about 1.0 mm, from about 0.5 mm to about 0.7 mm, or about 0.5 mm thick, about 0.7 mm thick, about 1.1 mm thick, or about 1.0 mm thick.

Figure 2:
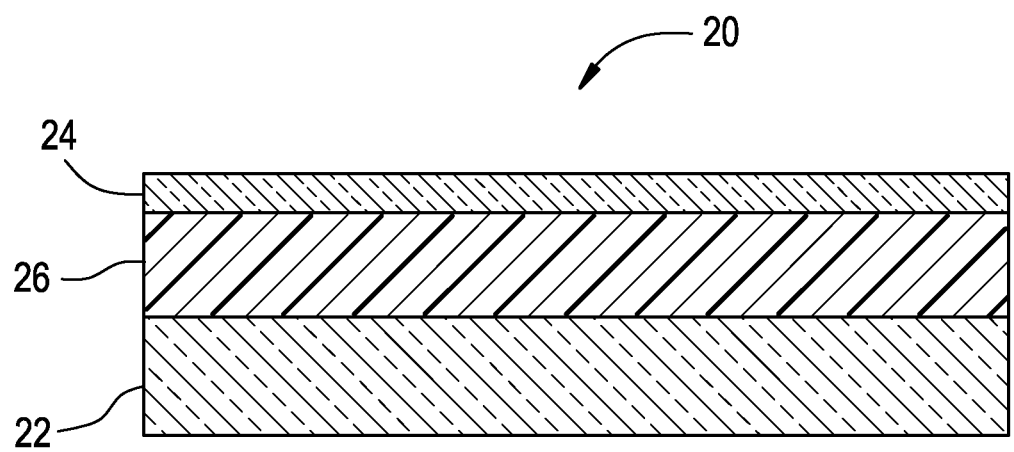
FIG. 2 is a partial cross-sectional schematic illustration of a laminated glass structure according another embodiment of the present description.

FIG. 2 is a partial cross-sectional schematic illustration (not to scale) of a hybrid strengthened thin glass laminate structure 20 according to another embodiment of the present disclosure. The hybrid thin glass laminate (or laminate or laminated structure) 20 may include a relatively thick glass sheet 22 that is not chemically strengthened and a chemically strengthened thin glass sheet 24, such as Corning Gorilla glass as described above, laminated one on either side of a polymeric interlayer 26. The relatively thick glass sheet may be formed of a relatively economical soda lime glass sheet having a thickness of about 1.6 mm, by way of example. The relatively thick soda lime glass sheet 22 may be an unstrengthened glass sheet, but may optionally be chemically strengthened glass sheet or thermally tempered glass sheet in other embodiments hereof. The thin glass sheet 24 may optionally be formed of unstrengthened glass sheets according to other embodiments hereof.

As described in U.S. Pat. Nos. 7,666,511, 4,483,700 and 5,674,790, Corning Gorilla glass is made by fusion drawing a glass sheet and then chemical strengthening the glass sheet. In this type of process, the glass sheets are typically immersed in a molten salt bath for a predetermined period of time. Ions within the glass sheet at or near the surface of the glass sheet are exchanged for larger metal ions, for example, from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress is induced within a central region of the glass sheet to balance the compressive stress. Corning Gorilla glass has a relatively deep depth of layer (DOL) of compressive stress, and presents surfaces having a relatively high flexural strength, scratch resistance and impact resistance.

The polymer interlayer 16, 26 may be of a single layer of homogeneous material, a composite "acoustic" material with a lower modulus core, or combinations of different thickness layers with tint or other properties as required by the finished product. The total thickness of the interlayers may be between about 0.76 mm and about 1.57 mm. Thinner interlayers may be employed than are typical due to the thin flexible nature of at least one of the glass sheets in the laminate. The polymer interlayer 16 may be, by way of example only, standard PVB, acoustic PVB, ethylene vinyl acetate (EVA), thermoplastic polyurethane (TPU), or other suitable polymer or thermoplastic material. One or more polymer interlayers may be incorporated into a glass laminate. A plurality of interlayers may provide complimentary or distinct functionality, including adhesion promotion, acoustic control, UV transmission control, and/or IR transmission control.

Figure 3A:
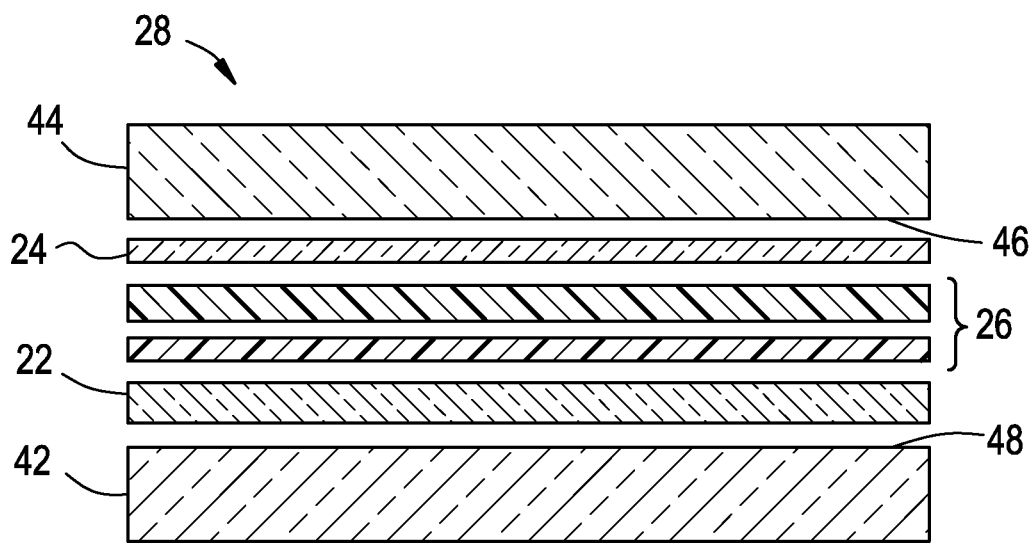
FIGS. 3A, 3B and 3C are schematic illustrations of vacuum bag laminating process according to an embodiment of the present disclosure.
Figure 3B:
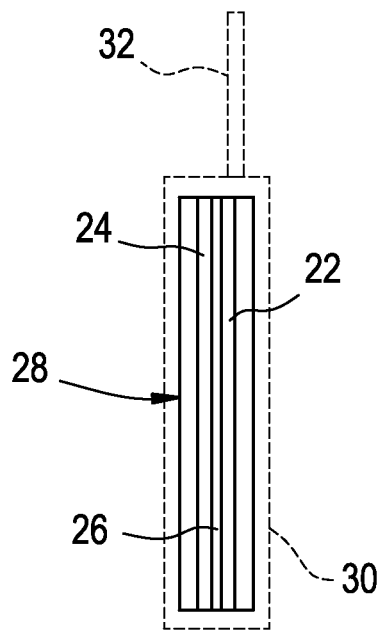
Figure 3C:
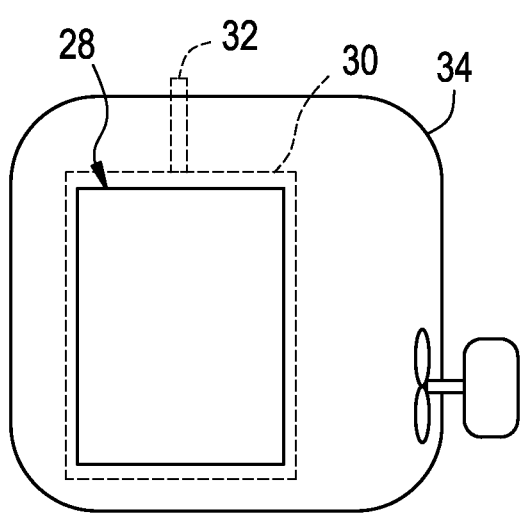
Figure 4:
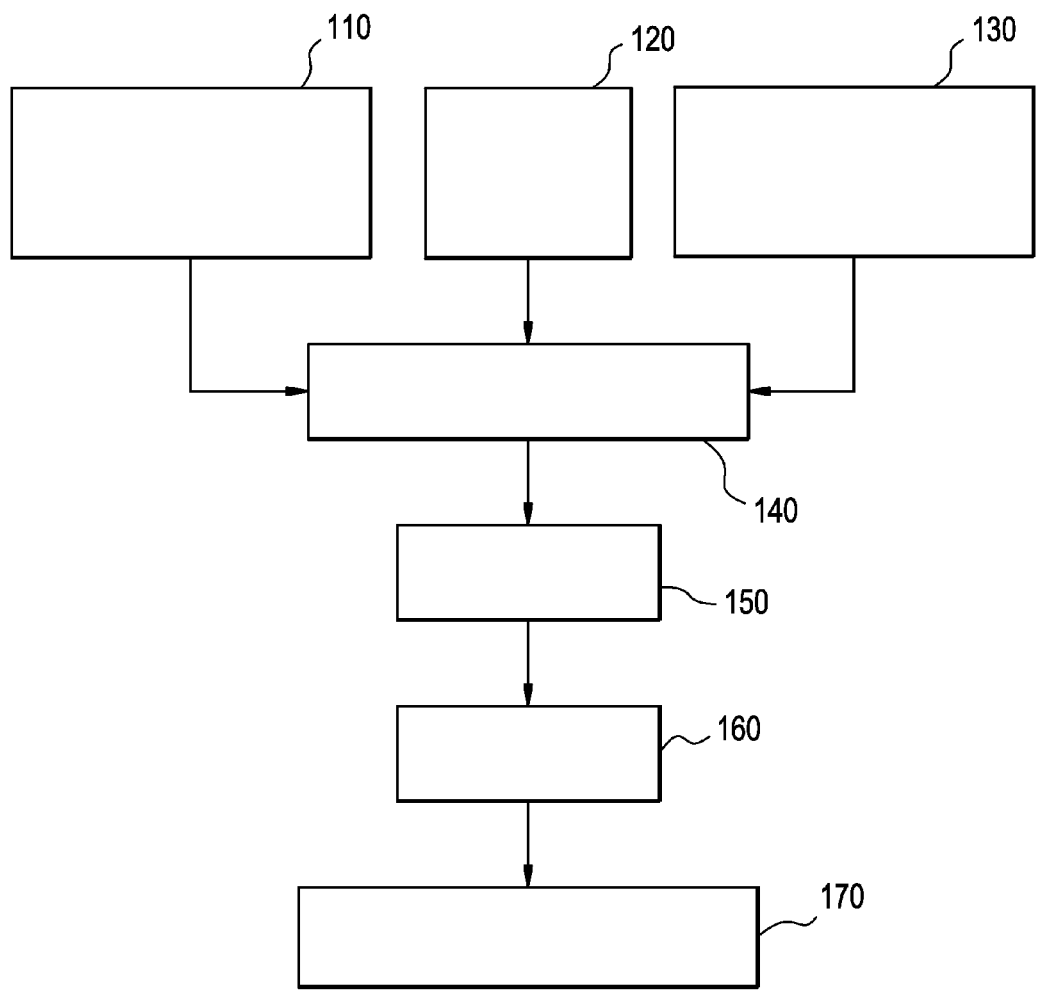
FIG. 4 is flowchart illustrating the vacuum bag laminating process of FIGS. 3A through 3C.

A vacuum ring laminating process for producing thin glass laminates with improved optical distortion characteristics according to an embodiment hereof is schematically illustrated (not to scale) in FIGS. 3A through 3C and in the flowchart of FIG. 4. First, the glass sheets and the polymer interlayers are prepared (boxes 110 and 120 in FIG. 4). The glass sheets 12 and 14 (or 22 and 24) are cut to the correct shape and the edges are finished to the specifications required for the finished laminate. If a shape other than flat/planar is required for the final laminate, the next step would be to impart that shape to the glass sheets glass sheets 12 and 14 (or 22 and 24) via conventional heat treatment glass forming processes that are well understood in the art. The glass sheets may be nominally formed to the desired final laminate shape. It is said that the glass sheets may be nominally formed to the desire final laminate shape because shape variations commonly occur when forming glass sheets into curved shapes causing shape mismatch from one glass sheet to the next. Optional strengthening of the glass via an ion exchange process may be performed next, and the final preparation step is to clean and dry the glass to remove residual ion exchange salts and other surface contamination.

To prepare the polymer interlayer material 16 (box 120 in FIG. 4), polymer sheets may be pre-cut to match the dimensions of the glass. If the polymer material has not been stored under controlled temperature and humidity conditions, then it must be dried using a combination of temperature and humidity levels to remove excess moisture. Excessive moisture in the PVB film can result in bubble formation and poor adhesion in the finished laminate.

Buffer plates 42 and 44 used to assistance in maintaining the desired surface shape of the laminate may also prepared in a manner similar to the preparation of the soda lime glass sheets box 130 in FIG. 4). The preparation of the buffer plates, apart from cleaning that would be desirable between runs, would only be required for the first use of the buffer plates. In other words, once prepared, the buffer plates may be re-used over and over again for an indeterminate number of process runs.

After all materials have been prepared, the pre-laminate stack is assembled in a step called lay-up (box 140 in FIG. 4). Lay-up may consist of stacking and aligning the individual components so that the final laminate is sandwiched between two matched buffer plates 42 and 44 as illustrated in FIG. 3A. The glass sheet 22 (the first glass sheet) is placed on the first buffer plate 42 (the first buffer plate), the interlayer 26 is placed on the first glass sheet 22, the glass sheet 44 (the second glass sheet) is placed on the interlayer 16, and the buffer plate 44 (the second buffer plate) is placed on the second glass sheet to form an pre-laminate stack 28. When all components have been stacked and aligned, the pre-laminate stack may be secured with pieces of temperature-resistant tape on at least two edges to prevent shifting of the individual layers of the stack. The pre-laminate stack 28 may then be wrapped in a breather cloth (not shown) that allows for the expulsion of air from the pre-laminate stack under application of vacuum.

The wrapped pre-laminate stack may then be sealed within a vacuum bag 30 as schematically illustrated in FIG. 3B (box 150 in FIG. 4). The bagged pre-laminate stack may then be placed within an autoclave chamber, or in simple oven, as illustrated in FIG. 3C and attached to the vacuum system. A vacuum is drawn in the vacuum bag 30 via a vacuum tube 32 on the vacuum bag for applying a vacuum to the peripheral edges of the assembled stack 28. After a vacuum check of the sealed vacuum bag, the autoclave is closed and the process run or laminating process is initiated (box 160 in FIG. 4). The autoclave used for the lamination processing may be capable of producing temperature and pressure conditions that are consistent with standard auto glazing industry processing, for example up to 200° C. and 180 psi. The autoclave 34 is optionally pressurized to increase the pressure applied by the buffer plates on the glass sheets. The temperature in the autoclave is elevated to a temperature that is at or somewhat above the softening temperature of the polymer interlayer 16 (the soak temperature). The vacuum and soak temperature are maintained for a period of time (the soak time) sufficient to soften the interlayer 26, de-air the space between the two glass sheets 22 and 24, and bond/tack the softened interlayer 26 to the two glass sheets 22, 24, thereby laminating the pre-laminate stack 28 together to form a glass laminate. Similar process conditions may be employed to laminate the stack using a vacuum ring in place of the vacuum bag.

After the completion of autoclave processing, the bagged laminate is removed from the autoclave and allowed to cool-down. The finished laminate is removed from the bagging materials and cleaned (box 170 in FIG. 4). The resulting laminate will be almost clear or clear, especially around the edges, which should be completely sealed. If necessary, the laminate may then be autoclaved at an elevated temperature and pressure to complete and clarify the laminate. As described above, when at least one of the glass sheets being laminated is a thin glass sheet having a thickness not exceeding 1.0 mm, then the presently described procedure may eliminate the need for any subsequent autoclave step.

The present disclosure describes a process in which the two glass sheets and the interlayer are laminated in an autoclave producing a glass laminate with improved optical properties. However, in cases where there is no need to pressurize the chamber in which the stack is being laminated, then a more economical oven equipped with vacuum ports to draw a vacuum in the vacuum ring bag may be employed in place of an autoclave.

When thin glass sheets are used to form a glass laminate, the glass sheets (and the resulting glass laminate) are susceptible to deformation from uneven stresses produced in the glass sheets and the assembled stack 18 during typical vacuum bag and vacuum ring lamination processes. The stresses in the assembled stack cause optical distortion and shape variations in the resulting glass laminate. When a typical vacuum bag lamination process is employed to laminate thin glass sheets, random uneven stresses are often generated in the assembled stack being laminated by the vacuum bag as it shrinks. These stresses often cause deformation of the relatively thin and pliable glass in a thin glass laminate as it is being laminated, which deformations remain in the glass laminate following lamination causing the previous mentioned optical distortion and shape variations in the glass laminate. When laminating relatively thick glass sheets having a thickness exceeding 1 mm, the uneven stresses created by the vacuum bag are not large enough to create any significant deformation of the glass sheets or the laminated structure in general due to the rigidity of the thick glass sheets. In typical vacuum ring lamination processes, the edges of the stack are subjected to uneven stress from the vacuum ring pressing on the outer periphery of the glass sheets. By reducing either the vacuum applied to the vacuum bag or vacuum ring, or by reducing the pressure/force with which the vacuum ring is clamped on the periphery of the assembled stack, it is possible to reduce the thin glass's and the stack's tendency to deform during lamination. It has been found that by both reducing the vacuum and reducing the clamp pressure of the vacuum ring, a significant reduction in the deformation around the edges of the laminate can be obtained, thus achieving minimal distortion around the edges of the laminate. It is also been found that it is possible to reduce the stresses and deformation in the laminate even further by reducing the lamination temperature and pressure (e.g. the pressure in the autoclave) applied to the stack.

The present disclosure describes optimal lamination process conditions for laminating glass laminates having at least one thin glass sheet having a thickness not exceeding 1 mm having acceptable level of optical distortion for use in auto glazing and other applications. In an embodiment hereof, the process conditions may include relatively low soak temperature, pressure and time compared to typical vacuum bag or vacuum ring lamination processes. For example, the soak temperature may be in a range from about 100° C. to about 150° C., or about 125° C., the soak pressure may be in a range from about 70 psi up to 180 psi, and the soak time may be about 30 minutes, while applying a vacuum to the peripheral edge of the assembled stack (via the vacuum ring or a vacuum bag). At low soak temperatures, any pressure between 70 psi and 180 psi may be used to obtain low optical distortion laminates. At higher soak temperatures or longer soak times, autoclave pressures less than 180 psi, and preferably less than 100 psi may be used. Soak time in the autoclave is determined in part by the amount of glass in the autoclave. The soak time should be sufficient for all of the laminates to reach the desired soak temperature and for the interlayer to fully wet and develop adhesion between the interlayer and the glass sheets (e.g. tack to the glass sheets). Soak time can vary between 30 minutes and 150 minutes. The vacuum applied to the vacuum bag or the vacuum ring may be not exceeding about −0.9 bar, not exceeding about −0.7 bar, not exceeding about −0.6 bar, not exceeding about −0.5 bar, or within a range from about −0.2 to about −0.7 bar, from about −0.3 to about −0.7 bar, from about −0.2 to about −0.6 bar, or from about −0.3 to about −0.6 bar. In some instances, the vacuum applied to a vacuum ring may not exceed about −0.6 bar, with a soak temperature in a range from about 90° C. to about 100° C., and a soak time of about 30 minutes. If autoclaving is desired, then the vacuum ring is removed and the laminate may be autoclaved at 125° C., hold at temperature, 70 psi, for 30 min. and a heating and cooling rate of 0.55° C./min.

Whereas a typical vacuum ring (or vacuum bag) process employs an additional subsequent autoclave step, the previously described lamination process may employ a soak temperature of from about 120° C. to 150° C. and a pressure of 150 psi to 200 psi within the autoclave to form the glass laminate without any subsequent processing. The present disclosure thus provides an improved vacuum ring and vacuum bag process for producing thin laminated glass structures having improved optical distortion and shape consistency than is possible when using typical vacuum ring or vacuum bag process when laminating thin glass sheets, without the need for subsequent higher temperature and pressure processing in an autoclave.

In order to provide shape control to the laminates during the lamination process, the buffer plates 42 and 44 are placed in direct contact with each side of each pre-laminate stack. The buffer plates may be pre-formed with forming surfaces that conform to the desired final shape of the thin glass laminate, which may include planar (flat) shape. The curved shape may be a simple curved shape with a single axis and a single radius of curvature or a complex curved shape with multiple axes and varying radius of curvature or multiple radii of curvature. The buffer plates may, for example, be glass sheets, such as soda lime glass sheets, about 4 mm to about 6 mm thick that have been formed to the desired shape using conventional glass forming/shaping processes as are well understood in the industry (such bending and shaping processes as commonly used in the auto glazing industry).

The initial shape of the thin glass sheets 12 and 14 placed into the assembled stack may be flat/planar, or the glass sheets may be nominally formed to the desired final laminate shape. It is said that the glass sheets may be nominally formed to the desire final laminate shape because shape variations commonly occur when forming glass sheets into curved shapes causing shape mismatch from one glass sheet to the next. The vacuum simultaneously removes air from between the layers of the laminate stack and causes the flexible glass sheets 12 and 14 to bend and form to the shape of buffer plates 42, 44 and to each other. Although the buffer plates described herein are formed of soda lime glass, the material selection for the buffer plates may include other semi-rigid, formable materials such as aluminum, steel, ceramic, etc.

Experiment 1

Figure 5:
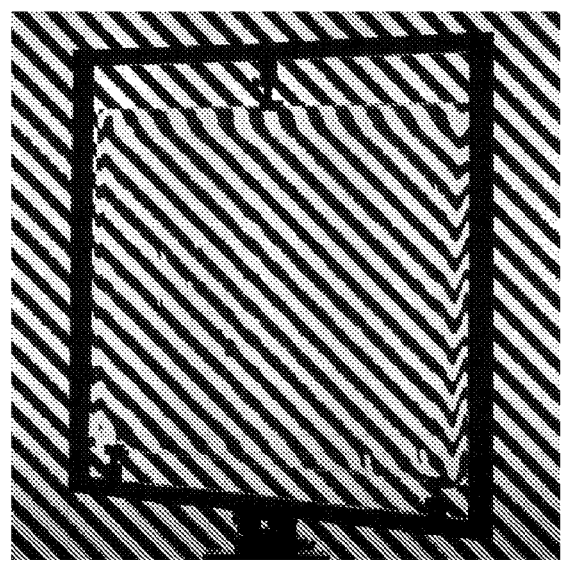
FIG. 5 is a photo of illustrating the optical distortion in a thin glass laminate that was laminated without using buffer plates.
Figure 6:
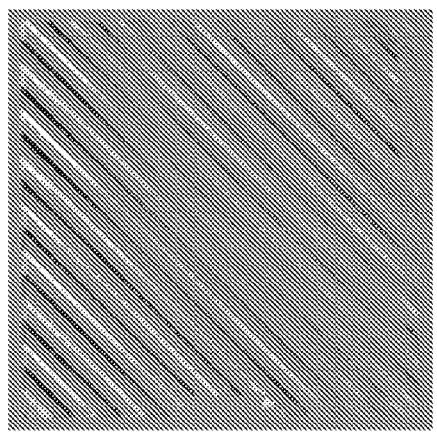
FIG. 6 illustrate the optical distortion the optical distortion in a thin glass laminate that was laminated with buffer plates, but not at optimum conditions according an embodiment of the present disclosure.
Figure 7:
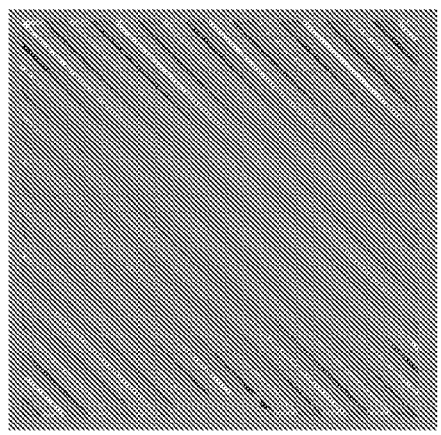
FIG. 7 illustrate the optical distortion the optical distortion in a thin glass laminate that was laminated with buffer plates at optimum conditions according an embodiment of the present disclosure.

A pure strengthened all-Gorilla® glass laminate was processed in a vacuum bag without buffer plates. FIG. 5 illustrates process-induced distortion formed in the thin glass laminate. Process-induced optical distortion is especially evident along the edges of the laminate, while some of the more severe interior anomalies may be due to pre-lamination forming issues. The same thin glass laminate structure was processed using buffer plates as described above, except at a higher temperature and pressure than described. FIG. 6 shows higher distortion in the resulting laminate, especially on the left side and in the upper right corner. The same laminate structure was processed with buffer plates at the optimum conditions described herein. FIG. 7 shows that there was some distortion in evidence along the top and bottom edges of the resulting laminate, but the center area appears undistorted. The depictions of distortion in FIGS. 6 and 7 were produced by photographing the laminates in front of a back-lit "zebra board" as is shown in FIG. 3, then subtracting the background image of the stripes to highlight the areas where shifts in the lines have occurred due to distortion.

Experiment 2

Pre-laminate stacks or lay-ups consisting of two pieces of formed chemically strengthened Gorilla® Glass 0.7 mm thick with a PVB interlayer or one piece of 0.7 mm thick chemically strengthened Gorilla® Glass and a piece of 1.6 mm thick soda lime glass were assembled. Relatively rigid buffer plates of the correct shape that consisted of either thicker Gorilla® Glass or soda lime glass were placed either on one or both sides of the assembled lay-ups. Around the periphery of this entire assembly (lay-up plus buffers) a flexible vacuum ring was attached. The space within the vacuum ring was evacuated to a pressure of about −0.9 bars to remove air between the glass and PVB and to cause the laminate assembly to assume the shape of the rigid buffer plates. The vacuum was maintained for 15 minutes at ambient temperature then at 100° C. for 35 minutes. This entire stack (pre-laminate and buffers) were autoclaved at 130° C. for 40 minutes. The resulting laminates had very little optical distortion. Similar results were achieved using vacuum bags instead of vacuum rings and full vacuum pressure.

Experiment 3

A pure strengthened all-Gorilla® glass laminate consisting of two pieces of 0.7 mm thick glass with a PVB interlayer was processed using vacuum rings applied to the periphery of this the assembled stack. Air removal and tacking of the assembled stack was done using a vacuum of −0.9 bars for 20 minutes at 20° C. then for an additional 30 minutes at 100° C. to tack the glass and PVB together. The resulting pre-laminate had optical distortion around the edges. This pre-laminate was autoclaved, after removal of the vacuum ring, at 80 psi and 130° C. for 36 minutes. The resulting laminate had essentially no optical distortion after this autoclave step. The autoclave step acts to remove optical distortion present after the air removal and tack step carried out at −0.9 bars.

As described above, pressure may optionally be applied to the assembled stack by pressurizing the autoclave in order to press the central portions of the two glass sheets together by elevating the pressure inside the autoclave 24. Due to their thin flexible/pliable nature, the thin glass sheets 12 and 14 readily form to each other, thereby closing any gaps between the thin glass sheets and the interlayer 16 and eliminating air bubbles. It has been found that the pressure inside the autoclave can be reduced compared to typical laminating processes so that the pressure in the autoclave does not exceed 70 psi or 80 psi, for example, or the step of pressurizing and controlling the pressure within the autoclave may be completely eliminated and the pre-laminate may be processed at atmospheric pressure enabling the use of a simple oven in place of an autoclave. The pliable nature of the thin glass sheets also allows for a lower soak temperature and a lower vacuum pressure compared to typical vacuum ring and vacuum bag laminating processes as previously described herein.

In another embodiment of a vacuum laminating process according to the present disclosure, multiple laminated structures may be laminated/processed as described in relation to FIGS. 3A, to 3C simultaneously in a single vacuum bag or with a single vacuum ring in a single lamination/de-air and tack process. In this way, multiple vacuum bags or vacuum ring lamination operations may be eliminated. In such a process, multiple pre-laminate stacks may be stacked between a single pair of buffer plates 42 and 44.

This present disclosure describes vacuum ring and vacuum bag lamination process and process conditions that achieve a transparent glass laminate with improved optical distortion and shape consistency compared to typical vacuum ring mold processes by taking advantages of the thin glass's flexibility. The presently disclosed processes are capable of preserving the pristine optical quality of the laminates in terms of optical distortion especially when thin glass is involved. The present disclosure teaches how to utilize both vacuum ring and vacuum bag process to directly produce transparent glass laminates with improved optical distortion and shape consistency when thin glass is used in a single step, thus eliminating the additional autoclave step at higher temperature and pressure to save time and resources. The present disclosure also teaches how to use buffer plates on either side of the pre-laminate during lamination to promote shape consistency of laminates made from all thin glass sheets, especially when making a curved sample. The present disclosure also teaches how to drastically reduce the time, labor, and resources needed for the production as compared to the production processes by processing a plurality of laminate stacks simultaneously. The present disclosure describes processes that not only lower the vacuum applied to the vacuum ring or vacuum bag and the clamping pressure of the vacuum ring compared to typical thick glass processes, but also lower the temperature and pressure of the autoclave cycle when laminating thin glass, thereby reducing the time and resources required to laminate and form the thin glass laminates. The present disclosure also describes and includes the improved thin glass laminates produced from this improved process.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A process of forming a glass laminate characterized by the steps of:
    providing a first buffer plate having a first forming surface, the first forming surface having a shape that conforms to a desired final shape of the glass laminate;
    providing a second buffer plate having a second forming surface, the second forming surface having a shape that conforms to the desired final shape of the glass laminate;
    providing a first glass sheet, a second glass sheet and a polymer interlayer, wherein at least one of the first glass sheet and the second glass sheet has a thickness not exceeding 1 mm;
    stacking the first glass sheet on the first forming surface of the first buffer plate such that a first surface of the first glass sheet is in direct contact with the first forming surface;
    stacking the interlayer on a second surface of the first glass sheet, wherein the second surface is opposite the first surface of the first glass sheet;
    stacking the second glass sheet on the interlayer opposite the first glass sheet;
    stacking the second buffer plate on the second glass sheet such that the second forming surface is in direct contact with a surface of the second glass sheet, wherein the surface of the second glass sheet is opposite the interlayer, forming an assembled stack;
    clamping a vacuum ring to at least a portion of at least one peripheral edge of the assembled stack;
    applying a vacuum to the peripheral edge of the assembled stack through the vacuum ring;
    heating the assembled stack with the vacuum ring attached thereto in an oven to a soak temperature at or above the softening temperature of the interlayer;
    maintaining the vacuum and the soak temperature for a period of time (a soak time) sufficient to de-air the interlayer, tack the interlayer to the first glass sheet and the second glass sheet, and form the first and second glass sheets and the interlayer to the first and second forming surfaces;
    removing the assembled stack from the oven; and
    removing the buffer plates from the glass laminate, wherein the glass laminate has the desired final shape.

2. The process of claim 1, wherein both the first glass sheet and the second glass sheet have a thickness not exceeding 1 mm.

3. The process of claim 1, wherein both the first glass sheet and the second glass sheet are chemically strengthened glass sheets.

4. The process of claim 1, wherein the interlayer is formed of a polymer selected from the group consisting of standard polyvinyl butyral (PVB), acoustic PVB, ethylene vinyl acetate (EVA), thermoplastic polyurethane (TPU), and an ionomer.

5. The process of claim 1, wherein maintaining the vacuum through the vacuum ring and the soak temperature for the soak time comprises placing the assembled stack with the vacuum ring clamped thereto in an autoclave at a pressure not exceeding 180 psi during the soak time.

6. The process of claim 1, wherein the soak temperature does not exceed about 150° C.

7. The process of claim 1, wherein the soak temperature does not exceed about 125° C.

8. The process of claim 1, wherein the soak temperature is in a range from about 100° C. to about 150° C.

9. The process of claim 1, wherein the vacuum applied to the peripheral edge of the assembled stack does not exceed about −0.9 bar.

10. The process of claim 9, wherein the vacuum applied to the peripheral edge of the assembled stack does not exceed about −0.7 bar.

11. The process of claim 10, wherein the vacuum applied to the peripheral edge of the assembled stack does not exceed about −0.6 bar.

12. The process of claim 10, wherein the vacuum applied to the peripheral edge of the assembled stack is in a range from about −0.2 to about −0.6 bar.

13. The process of claim 1, wherein heating comprises heating the assembled stack to a soak temperature not exceeding 150° C.

14. The process of claim 1, further comprising:
    placing the assembled stack with the vacuum ring clamped thereto in an autoclave after maintaining the vacuum and the soak temperature for the soak time; and
    maintaining a pressure within the autoclave in a range of from about 70 psi to about 180 psi during a second soak time.

15. The process of claim 1, wherein:
    the first forming surface has a shape nominally matching a desired shape of the glass laminate to form the assembled stack; and
    the second forming surface has a having shape nominally matching a desired shape of the glass laminate to form the assembled stack.

16. The process of claim 15, wherein at least one of the first buffer plate and the second buffer plate are formed of a sheet of soda lime glass having a thickness of about 4 mm to about 6 mm.

17. The process of claim 1, wherein at least one of the first buffer plate and the second buffer plate are formed of a sheet of soda lime glass.

18. The process of claim 1, wherein at least one of the steps of providing a first buffer plate and providing a second buffer plate comprises the steps of:
    providing a glass sheet;
    bending the glass sheet prior to stacking the glass sheet such that the glass sheet has a surface having a shape nominally matching the desired final shape of the glass laminate.

19. The process of claim 18, wherein the at least one of the first buffer plate and the second buffer plate are formed of a soda lime glass sheet having a thickness of about 4 mm to about 6 mm.

20. The process of claim 1, wherein the desired final shape is a curved shape.

* * * * *